June 16, 1936.                E. ANGELONI                2,044,343
                            GYROSCOPIC DEVICE
                           Filed Oct. 11, 1932
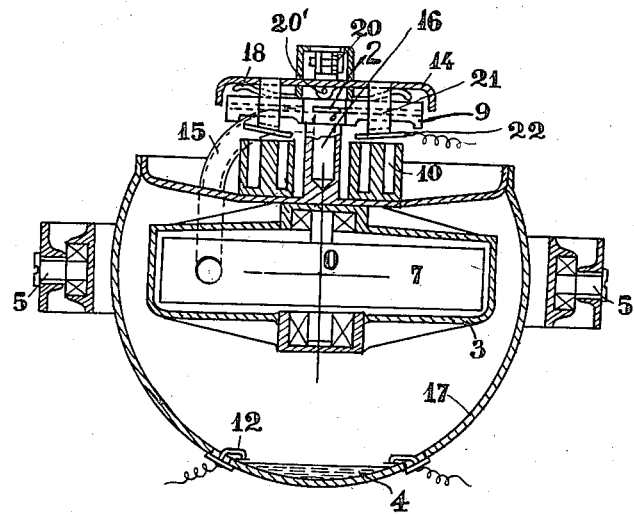
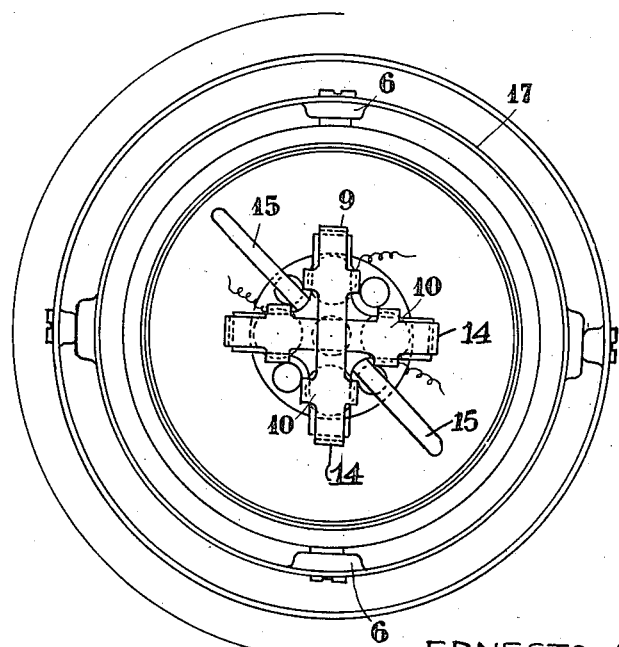
ERNESTO ANGELONI
INVENTOR
BY Haseltine, Lake & Co
ATTORNEYS Patented June 16, 1936

2,044,343

UNITED STATES PATENT OFFICE 2,044,343

GYROSCOPIC DEVICE

Ernesto Angeloni, Rome, Italy

Application October 11, 1932, Serial No. 637,280
In Italy October 14, 1931

1 Claim. (Cl. 74—5)

This invention relates to a gyroscopic stabilization device which is particularly applicable to sighting instruments for dropping bombs from aircrafts, for stabilizing the sighting line on warships, and for various other uses in aerial and marine navigation, by the automatic determination of the true local horizon at any point on which it may be transported, independently of the movements of the support on which it is mounted.

Devices have already been proposed for maintaining automatically the axis of the gyroscope normal to the plane of the local horizon, reproducing this latter automatically with a liquid conductor of electricity, but the means that have been used up to the present to attain this purpose have failed to give the practical results desired, owing to the substantial displacement of the centre of gravity of the whole system, due to the movements of the liquid mass, said displacement giving rise to the formation of antistabilizing precession couples, which prevented maintaining the system in the position desired, because the resultant of all the forces acting thereon will always pass through the said centre of gravity.

The gyroscopic stabilization device which forms the object of the present invention, is provided with means capable of correcting automatically the direction of its axis of rotation (and consequently also of its plane of rotation) so that it may be restored and be caused and maintained to coincide exactly with the local or true vertical of the point on which it has been transported always maintaining the direction of the resultant of the various forces acting on the stabilizer, passing through the centre of gravity of the system, independently from any displacement occurring in the liquid conductor. The said feature forms a very considerable improvement which enables the device according to the invention to be used in numerous practical applications.

The mercury or other liquid conductor of electricity, the free surface of which, when at rest, determines the local horizon, is contained in a bowl fixed to the casing of the gyroscope, the device being so mounted that the centre of gravity of the system (comprising the gyroscope and its suspension), must be made to coincide with the centre of the gimbal suspension, excluding from the system the weight of the liquid.

One form of construction of the gyroscope with automatic stabilization of the local horizon, is described hereinafter by way of example, and is illustrated in the accompanying drawing, in which:

Figures 1 and 2 show respectively in sectional elevation and in plan one form of embodiment of the invention.

In the form of embodiment shown in Figures 1 and 2, the mercury 4 is placed into a spherical casing 17, also containing the rotor 7, enclosed within a casing 3, the geometrical centre of the said casing 17 corresponding to the centre of gravity 0 of the system, which also corresponds to the geometrical centre of the gimbal suspension. This disposition prevents the formation of the disturbing torques produced when the axis of the apparatus is not vertical because the centre of gravity of the liquid mass will continue to remain in a true vertical line below the centre 0 for any inclination of the apparatus.

The air pressure produced inside the casing 3 by the rotation of the rotor 7, is conveyed through the tubes 15, into a cylindrical chamber 16, placed over the central part of the apparatus, from which chamber the mentioned air escapes through the four side openings 2 which terminate in the four radial nozzles 9, so that when one or both of the balancing closing members 14 each operating the closing of one of two nozzles, the air can escape through one or two nozzles 9, but when said members 14 are horizontal, all the nozzles 9 are open, and the air can escape freely on all sides.

In this form of construction (Figures 1 and 2) the four nozzles 9 are mounted symmetrically according to two straight lines disposed at right angles to each other, passing through the axis of the rotor 7, the electrical contacts 12 being placed very close to, at equal distances from the surface of the liquid conductor, when the axis of the system corresponds to the local vertical. The closing members 14, pivotally mounted on the pivot pins 20 and 20', are actuated by the corresponding electromagnets 10, which are controlled by the said respective electric contacts 12.

The pivoted closing members 14 are normally maintained in the open position by means of the underlying springs, 18, and are also provided with the side wings 21, provided at their lower ends with the iron flat pieces 22, the latter forming movable cores which are attracted by the corresponding magnets 10, so that when the corresponding electrical contacts close, the flat pieces 22 are attracted downwards, producing the obstruction of the corresponding nozzles 9, by means of the closing members 14 attached to them, as before described. As long as the axis of the system maintains its vertically (local vertical), the liquid conductor 4 when at rest does not close any contact, and all the nozzles 9 remain consequently open, giving free exit to the air, but, if the said axis becomes inclined with respect to the true or local vertical, the surface of the liquid conductor will form one or more electric contacts 12 which will produce the closing of the corresponding nozzles 9, and more precisely, for each contact produced in the container, there will correspond the closing of the nozzle 9 placed in the plane which is normal to the plane passing through the axis, which contains the said contact; said disposition being of course applicable to the example above mentioned, in which four contacts and four nozzles are provided, disposed at an angle of 90° with respect to each other.

The closing of one or two nozzles disturbs the balance of the forces acting round the axis of rotation of the gyroscope. A resultant reaction is thus produced which lies in a plane normal to the inclined plane of the gyroscope, and which as it does not pass through the centre of gravity coinciding the centre of the suspension, thus produces a couple. This in its turn, owing to the known property of the gyroscope, produces the rotation of the gyroscope system round a line parallel to the said reaction, and owing to the setting of the nozzle or nozzles which have remained open, this rotation brings the axis back to the position of the local vertical. When this position has been attained, the electric contacts are again all open, and consequently also the nozzles controlled by them, so that the air being again symmetrically delivered round the axis of rotation, produces symmetric reactions which equilibrate each other, and have consequently no resultant effect on the system. The device operates therefore so that its axis is constantly maintained in correspondence with the local vertical.

When the device is mounted on board an aircraft, the liquid in the container is subjected to the accelerations and centrifugal forces produced during the flight, and consequently its surface does not always take up the horizontal position; the said disturbances are, however, of short duration in comparison with the time required for shifting the axis of rotation, and may consequently be disregarded.

In aircraft operating during extended practice or circling flights lasting a considerable time, it may be found convenient to discontinue the working of the electromagnets by means of a hand control.

I claim:

In a gyroscopic stabilizer for control of the local horizon, comprising the combination of a gimbal suspension, a substantially bowl-shaped container shaped as a part of a sphere and carried by said suspension, a casing mounted within said container, a rotor mounted within said casing, the centre of the spherical outline of the container coinciding with the centre of the gimbal suspension and the centre of gravity of the stabilizer system coinciding with the center of the gimbal suspension, a pool of liquid forming a conductor of electricity normally situated at the bottom of said container, the surface of said pool coinciding with the local horizon and serving to determine the local vertical thereof, so that the resultant of the centrifugal and gravity forces acting on the liquid mass passes through the center of said gimbal suspension, the rotating mass of said rotor being adapted to produce compressed air within said casing while rotating, a plurality of horizontal nozzles in communication with the interior of said casing and a pivoted valve for each nozzle disposed radially with respect to the axis of the rotor, a set of electric contacts within said sphere symmetrically around and near the liquid conductor, said contacts being adapted to close independently one or more electric circuits through the liquid conductor when the axis of the rotor is displaced from the local vertical, a plurality of electromagnets electrically connected with said contacts, a link extending from each pivoted valve into the sphere of influence of said electromagnets whereby selective opening and closing of the horizontal nozzles is secured, through which nozzle openings the air compressed by the rotor escapes, producing the formation of a torque of reaction in a vertical plane which tends to restore and maintain the axis of the rotor, in coincidence with the local vertical of the point upon which the rotor is placed.

ERNESTO ANGELONI.